United States Patent [19]
Henderson

[11] 3,724,742
[45] Apr. 3, 1973

[54] PRESSURIZED DOUGH CONTAINER AND METHOD OF OPENING THE SAME

[76] Inventor: James R. Henderson, 2408 Branning Rd., Louisville, Ky.

[22] Filed: Nov. 26, 1971

[21] Appl. No.: 202,182

Related U.S. Application Data

[63] Continuation of Ser. No. 818,020, April 21, 1969, which is a continuation of Ser. No. 585,801, Oct. 11, 1966.

[52] U.S. Cl.......................229/51 BP, 53/22, 93/94, 99/172, 229/48 T
[51] Int. Cl............................B65d 5/54, B65d 17/00
[58] Field of Search.229/51 BP, 51 AS, 51 RT, 48 R, 229/48 T; 53/22; 93/94; 99/172

Primary Examiner—Davis T. Moorhead
Attorney—Lawrence E. Laubscher

[57] ABSTRACT

This disclosure embodies a generally cylindrical container having a body wall formed from spirally wound laminated material constructed to hold pressurized dough products such as pre-leavened dough and the like wherein the spirally formed laminations are permanently adhered together in a manner to provide sufficient body wall stiffness to rupture along a pre-determined spiral rupture line upon application of only a moderate indenting force against the body wall, the spiral rupture line in the specific embodiment disclosed being positively reinforced with the edges thereof connected to provide spaced apart circumferentially continuous sections only at the end portions of the container, the unreinforced spiral line of weakness between said reinforced end portions forming the rupture line along which the pressurized dough package can be ruptured by applying only moderate indenting force against a portion of said weakness line without peeling off any portion of any of the laminations.

5 Claims, 9 Drawing Figures

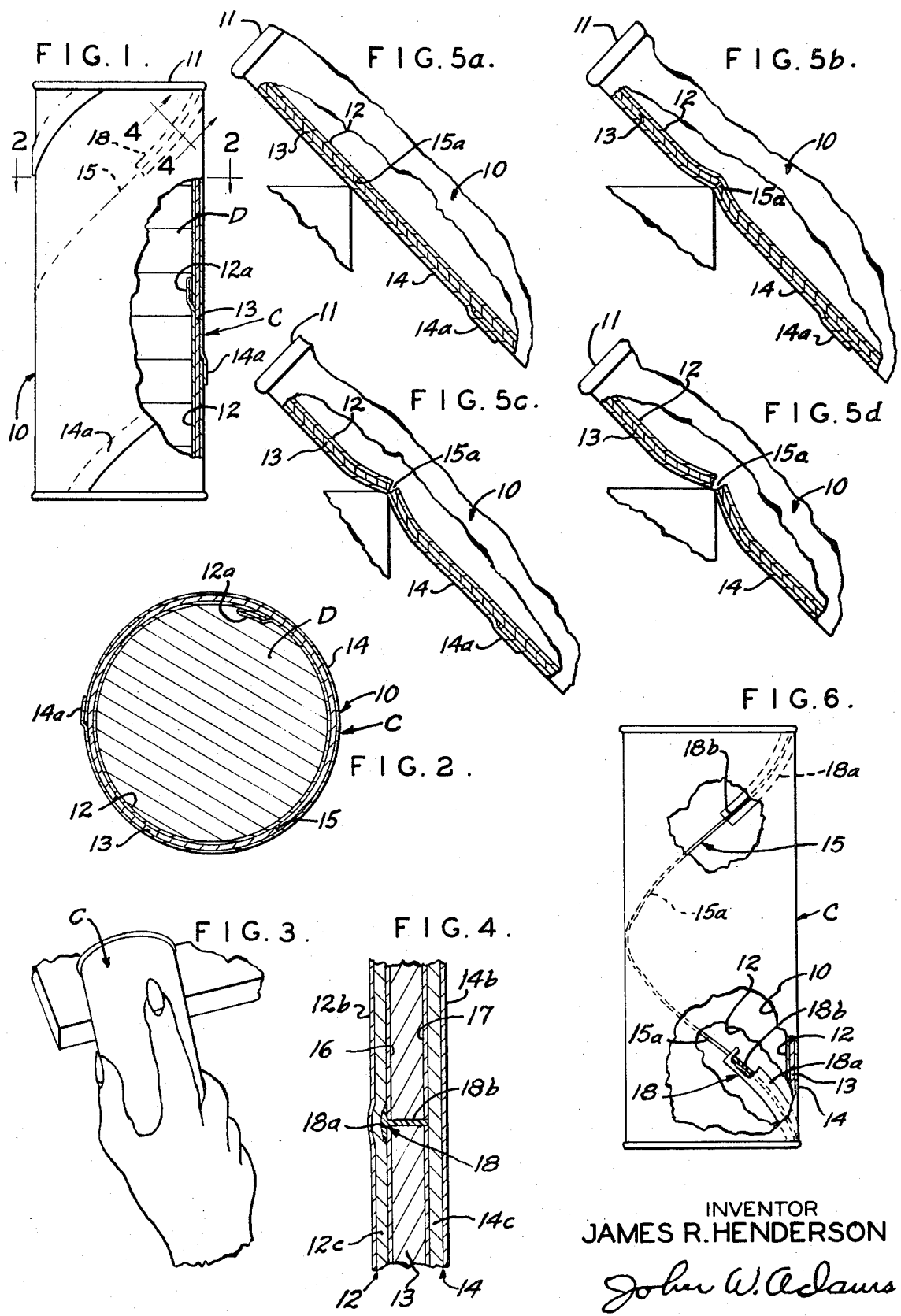

PRESSURIZED DOUGH CONTAINER AND METHOD OF OPENING THE SAME

This application is a continuation application of application Ser. No. 818,020 filed Apr. 21, 1969, which application, in turn, was a continuation application of the prior application Ser. No. 585,801 filed Oct. 11, 1966.

This invention relates to an improved one-step easy opening "no-peel" type pressurized dough container with improved strength characteristics.

For purposes of this application a "no-peel" container is defined as a container for pressurized dough products which requires no initial pre-weakening step for opening and which is provided with a weakness area in the container side wall which can be ruptured by the use of only moderate indenting force. A "peel-open" container is herein defined as a container which requires an initial pre-weakening step, such as peeling off all or part of the outer wrapper, to facilitate opening by moderate indenting force to rupture the liner. The "no-peel" type container disclosed and claimed in U.S. Pat. No. 2,975,068 was developed by and was assigned to applicant's assignee. The layers of this container were adhesively connected by a water-base or aqueous glue which proved to have sufficient strength characteristics to stand up satisfactorily during manufacturing, packing and closing operations and under shipping and handling conditions. This container will be referred to herein as a "glue-laminated no-peel" container. The "glue-laminated no-peel" type containers when construction of sufficient strength to hold a pressurized dough product during said manufacturing, packing and closing operations and under shipping and handling conditions, could be opened by moderate indenting force by impact against a protruding corner but required excessive indenting force if rapped against a straight edge. This was found to be somewhat objectionable because the housewife has become accustomed to rapping the "peel-open" dough containers with moderate indenting force against a straight edge after initial pre-weakening.

The instant invention is an improvement over said patented container as well as the container disclosed in the presently pending application Ser. No. 818,019 filed Apr. 21, 1969, which was a continuation of Ser. No. 552,804, filed May 25, 1966, (now abandoned), which was also assigned to applicant's assignee. The principal object of the invention disclosed in said presently pending application was to provide a container which could be easily opened by only moderate indenting force such as is produced by moderate impact against a straight edge and which would be substantially as easy to open as a "peel-open" type container after completion of the initial preweakening step such as the removal of the outer layer or wrapper. Such "peel-open" containers were disclosed in U.S. Pat. Nos. 2,793,126, 2,793,127 and 3,144,193. While the invention disclosed in said previously filed pending application provides the required easy opening characteristics and still provide sufficient strength to hold the pressurized dough products under most conditions, it was found that the stiff body wall structure which is required to provide the desired ease of opening, produced a container side wall with a weakened rupture line that was subject to damage from impact which might occur during the manufacturing, packing and closing operations and in shipping and handling. The instant container is constructed to stand up during the manufacturing, packing and closing operations and in shipping and handling, substantially as well as a "peel-open" type or "glue-laminated no-peel" type container and still be substantially as easy to open as a "peel-open" container which has been pre-weakened such as by removal of the outer wrapper.

As stated in said prior application, the strength of the weakened rupture line formed by the butt joint in the side wall of the spirally wound container disclosed therein depended to a large extend upon maintaining the adjacent edges forming said butt joint in tightly abutted side-by-side relationship to produce a "closed butt joint." However, in practice this was found to by somewhat difficult and containers were frequently produced having spaced apart adjacent edges herein referred to as "open butt joints."

In the case of spirally wound containers it therefore becomes necessary to compensate for such open butt joints. Tests have shown that the resistance to damage caused by impact (especially end to end impact) has been materially increased even with spiral containers having "closed butt joints" by providing reinforcement at both end portions of the butt joint and this reinforcement can readily be accomplished by positively tying together the respective edges of the body stock at the ends of said butt joint to prevent relative movement between said edges. The opening characteristics of containers embodying this invention are not materially affected by the reinforced end sections.

It is a general object of the present invention to provide an easy opening "no-peel" type container for pressurized dough products which is specifically constructed to provide improved strength characteristics over the container disclosed in said previously filed pending application without materially affecting the opening characteristics thereof.

More specifically it is an object to provide an easy opening "no-peel" type container for pressurized dough products, the side wall thereof having a circumferentially continuous end section at each end of the container and an intermediately disposed spiral line of weakness extending between said end sections.

Still more specifically it is an object to provide a spirally wound container with the adjacent edges of the body stock layer disposed in substantially abutted relation to form a butt joint extending the full length of the container but having the end portions of said butt joint positively reinforced and tied together as by a hot melt type adhesive material applied therebetween and spreading out on the marginal edge portions of the body layer adjacent said butt joint during the forming of the body tube to produce circumferentially continuous end sections and prevent relative movement between the reinforced edges of the butt joint and provide an intermediately disposed line of weakness extending between the reinforced end sections of the container.

The foregoing objects will be more apparent from the following description made in connection with the accompanying drawings wherein like reference characters refer to the same or similar parts throughout the several views, and in which:

FIG. 1 is an elevational view of a dough filled container embodying this invention having a portion of the body wall broken away;

FIG. 2 is a transverse sectional view taken substantially along the line 2—2 of FIG. 1 and drawn to a slightly larger scale than FIG. 1;

FIG. 3 is a perspective view showing a package embodying this invention being struck on the straight edge of a table;

FIG. 4 is an enlarged fragmentary sectional view through the laminated body structure taken substantially along the line 4—4 of FIG. 1 and showing the reinforcing material at the butt joint;

FIGS. 5a – 5d are fragmentary sectional views showing progressively the rupturing action produced by impact of the container wall against a straight edge; and FIG. 6 is a front elevational view of an empty container showing particularly the spiral butt joint and having portions broken away to show the reinforced end sections of the butt joint.

For purposes of illustration of this invention a spirally wound composite can is shown in the accompanying drawings. In this illustration a cylindrical container C is shown having a laminated body wall structure 10 with a pair of metal ends 11 crimped thereon. The container C is shown generally in FIG. 1 as being packed with a pre-leavened dough product D which exerts an internal pressure on the body wall 10 and ends 11.

The body wall structure 10 has a plurality of layers adhered together to form a laminated body wall system including an intermediate layer of body material 13 with an inner barrier layer or liner 12 completely covering and sealing the inner surface thereof and an outer barrier layer or label 14 completely covering and sealing the outer surface thereof. In the form shown these layers are spirally wound and as shown in FIG. 4 the inner liner 12 is made from a layer of metallic foil such as aluminum foil 12b with a paper backing 12c pre-laminated thereto. A doubled back lap joint 12a is provided to prevent the oil and moisture contained in the dough D from wicking into the paper backing 12c. The intermediate body wall 13 is made of suitable fiber board material such as kraft paper board stock and in the form shown is spirally wound with the adjacent edges disposed in substantially abutted relationship to form the spiral butt joint 15, the intermediate portion of which produces the line of weakness 15a (best shown in FIG. 6) which permits the container to be easily opened as will be hereinafter described. The outer wrapper or label 14 in the form shown is also made from a pre-laminated layer of foil 14b with a paper backing 14c and has a spiral lap joint 14a as best shown in FIG. 4. All of the joints, 12a, 15 and 14a, are out of register with each other as best shown in FIGS. 1 and 2. The three layers, 12, 13 and 14, are adhesively bonded together by a suitable adhesive such as the "dry-bond" adhesive designated as 16 and 17 in FIG. 4. The adhesive layer 16 connects the body layer 13 to the inner liner material 12 and specifically to the paper backing 12c of the liner. The adhesive layer 17 connects the paper backing 14c of the outer label 14 to the outer surface of the body layer 13.

The "glue-laminated no-peel" container disclosed in the patent previously identified herein and most fiber bodied containers in the industry use water-base glues to provide the adhesion between the layers of the laminated body wall structure. These water-base glues add materially to the moisture content of the fibrous paper body stock material and thus materially soften the same. As stated in said previously filed pending application the stiffness of the body wall is important to obtain the desired opening characteristics. For purposes of this application a "dry-bond" adhesive is defined as a non-aqueous adhesive which will bond the layers together without softening the body layer when the containers are manufactured or wound. The use of such a "dry-bond" adhesive is one method of obtaining the desired stiffness in the body wall structure. Experiments have indicated that it is also possible to dry out a glued body wall structure such as by applying heat thereto.

As was brought out in said previously filed pending application, surprising and unexpected results were obtained by providing the substantially stiffer body wall construction to produce the required easy opening characteristics. However, as previously stated herein the container disclosed in said application is less resistant to impact damage incurred during manufacturing, packing and closing as well as during shipping and handling than is the "glue-laminated no-peel" container.

An important concept of the instant invention is the provision of a container which has circumferentially continuous end sections with a spirally disposed intermediate weakness line 15a extending therebetween. In the case of a spirally wound can which is the form of the container disclosed, such continuous end sections are provided by reinforcing the end portions of the butt joint to reinforce and tie the two edges together. As best shown in FIG. 6, this reinforcement is provided by the use of an adhesive material 18 applied in a plastic or semi-liquid state in the butt joint 15 only at the respective end sections of the containers during the manufacture of the wound tubes. In FIG. 6 the upper portion of the label 14 is broken away to show this reinforced area and the lower portion of the container side wall 10 is broken away to show the inside and a portion of the liner 12 is also broken away to show the reinforcing material 18. This reinforcement can be accomplished by intermittent application of a thermo-setting hot melt adhesive ribbon at the required plastic consistency to flow into the butt joint during the spiral winding operation of the tubular body to produce a series of spaced-apart ribbon lengths. The tubing is then cut into individual can lengths with suitable registration controls and with each cut dividing each length of reinforcing ribbon of adhesive into two sections so that the desired length of reinforcement is provided at each end section of the container. In the embodiment of the invention illustrated, the hot melt forms a generally "T" shaped cross-section as best shown in FIGS. 4 and 6, with the "cross" portion of the "T" 18a being disposed between the liner and the body and the "web" portion of the "T" 18b lying in the butt joint. The reinforcement 18 produces a continuous circumferential section at each end of the container by positively interconnecting the edges of the butt joint at the end portions of the container. An intermediate line of weakness 15a is formed by the portion of the butt joint disposed between the two reinforced end sections and an initial rupture can be produced by moderate indentation of the side wall at said intermediate line of weakness 15a. Once the initial rupture is produced in the weakness line 15a, the container will immediately break open throughout its full length under the internal pressure of the dough and it may then be twisted open to unwrap the container from the dough.

THE OPENING OPERATION

Containers made in accordance with this invention are packed with a semi-solid pressurized product such as pre-leavened dough, can be easily opened by merely striking with moderate indenting force a pre-determined area of the side wall of the container on the straight edge of a kitchen counter, table or the like. This method of opening has become customary with present "peel-open" containers after pre-weakening. This pre-determined area is in substantial registration with the underlying intermediately disposed line of weakness 15a and would be indicated on the outside of the label 14. The force of the blow required to open this "no-peel" container is not significantly greater than the force required to open the former "peel-open" container with the wrapper removed. When the filled container is struck on a table edge at the pre-determined indicated area as indicated above, the side wall is indented at the line of weakness 15a. This causes the shearing edges of the relatively stiff body stock to rupture the liner 12 and label 14 in substantial registration with said line of weakness. The pressure of the dough then causes the container to immediately break open along its full length to quickly release the dough pressure and prevent dough extrusion and permit easy removal of the dough. The side wall of the container can also be indented by inwardly directed finger or thumb pressure at said predetermined area and the container may be opened in this manner if desired. While it is difficult to determine exactly how the indentation operates to produce the initial rupture, it is believed that this local area of indentation produces a spreading apart of the edges of the body stock at the indented portion of the line of weakness 15a and that this spreading apart of said edges at this point produces initial breaking of the liner 12 at the area of indentation. This initial breaking of the liner 12 is apparently followed almost simultaneously by rupture of the label 14 in this area and expansion of the initial rupture throughout the container length. After this initial rupture, the edges of the weakness line of the body layer are spread apart by the leverage exerted by the pressure of the dough which then causes the liner and lable to split the full length of the weakness line as well as an extension of this line through the reinforced end sections. As has been previously stated, the strength of the container will be determined at least in part by the strength of the liner 12 and the outer label 14 which serve to hold the line of weakness 15a together. It will also be apparent that attempting to increase the strength of the container by increasing the strength of the liner and label will make the container harder to open so that this approach produces the same problem previously described herein. Eliminating moisture in the container such as by the use of a "dry-bond" type adhesive permits the container to be opened much easier without decreasing the strength of the liner and label material.

A number of comparative tests have been made to determine the respective properties of the "glue-laminated no-peel" container construction compared with the "dry-bond" "no-peel" container construction. These tests include ease of opening tests which indicate the opening characteristics of the respective containers and also include comparative strength tests, moisture content determination and comparative board stiffness tests. The control or guide for the ease of opening on a straight edge as distinguished from a protruding corner has been the "peel-open" container from which the outer wrapper has been removed and only the glued-in liner remains to resist the pressure of the dough confined therein. As has been stated, these "peel-open" containers are exemplified generally in U.S. Pat. Nos. 2,793,126, 2,793,127 and 3,144,193. The constant endeavor in developing the instant "no-peel" container construction has been to make a container with the strength characteristics of the "glue-laminated no-peel" container, but having the opening characteristics of the "peel-open" container with the outer wrapper removed. In spite of the fact that the tests which have now been established indicate that the "dry-bond" system is stronger than the glued construction in certain respects such as in end to end compression and at least as strong as the glued containers in ring tensile strength and transverse side wall crush strength, the "dry-bond" container is more susceptible to damage from impact which might occur during the manufacturing, packing and closing operations and in shipping and handling than is the glued container. However, by providing a circumferentially continuous side wall section at each end of the container we have found that the resistance to end to end impact damage and side wall damage in the area of the reinforced end sections is substantially equal to the resistance to such impact damage of the glued container and is at least as strong as or stronger than the glued container in other respects while still maintaining the desired opening characteristics which are generally similar to the opening characteristics of the "peel-open" type container after the body has been pre-weakened. It has been found that the optimum opening characteristics are obtained with the instant improved "no-peel" container by applying the indenting force to an area in registration with the intermediate line of weakness as previously described herein; however, tests have also shown that where an intermediate weakness line has been provided, the container also can be opened with slightly increased indenting force applied in the portion of the reinforced circumferentially continuous end section in relatively close proximity to the ends of the weakness line.

It will be seen that this improved "no-peel" type container provides not only the opening characteristics but also the strength characteristics required for a commercially acceptable container for pressurized dough products.

It will, of course, be understood that various changes may be made in the form of the container, and in the details, arrangement and proportion of the parts thereof without departing from the scope of my invention, which generally stated consists in the matter set forth in the appended claims.

What is claimed is:

1. An easy one-step opening "no-peel" type container for pressurized dough products, comprising:
   a. a generally tubular open-ended laminated body wall (10), including
      1. a relatively stiff fibrous body layer (13) spirally wound into tubular form with the longitudinal edges thereof defining a spiral butt joint (15) that extends the full length of the body wall; and
      2. inner and outer moisture-resistant barrier layers (12, 14) permanently laminated to the inner and outer surfaces of said body layer, respectively, in bridging relation across said butt joint, said barrier layers being of a material
         a. to combine with the body layer to hold the dough product until the container is opened, and
         b. to provide barrier properties to substantially isolate said body layer from contact with the product confined within the container and from the moisture of the ambient air to prevent absorption and maintain sufficient body wall stiffness to produce the desired predictable opening characteristics;
   b. means for reinforcing only the end portions of said butt joint, comprising a pair of masses of hot melt type adhesive (18) arranged in spaced relation at opposite ends of said butt joint, respectively, each of said adhesive masses connecting together the adjacent edge portions of said body layer, respectively, thereby to define in said body wall between said spaced adhesive masses an intermediate line of weakness (15a); and
   c. end closure means (11) for closing the ends of said body wall, thereby permitting said inner and outer barrier layers to be ruptured along said intermediate line of weakness to facilitate removal of a dough product from the container upon striking of said body wall with moderate indenting force against a straight edge of a kitchen counter or the like.

2. The structure set forth in claim 1, wherein at least one of said barrier layers is laminated to the respective surface of said body layer by means of a "dry-bond" type adhesive.

3. The structure set forth in claim 1, wherein at least one of said barrier layers is spirally wound with the respective edges thereof out of register with the spiral rupture line of the body layer.

4. An easy one-step opening "no-peel" container for pressurized dough products, comprising
   a. a single intermediate body layer of stiff fibrous board material (13) helically wound to define a tubular open-ended body wall, said body wall containing a rupture line (15) extending the full length thereof;
   b. means for reinforcing the ends of said rupture line and for connecting together the corresponding edge portions thereof, respectively, comprising a pair of spaced masses of hot malt type adhesive (18) applied solely to the respective end portions of said rupture line and extending axially therealong a sufficient distance to reinforce the same, each of said masses preventing relative shifting movement between said edges, said spaced adhesive masses defining therebetween within said rupture line an intermediate line of weakness (15a);
   c. an inner layer (12) permanently adhesively connected with the inner surface of said body wall by means of a "dry-bond" adhesive, said inner layer covering said rupture line;
   d. an outer layer (14) permanently adhesively connected with the outer surface of said body wall by means of a "dry-bond" adhesive, said outer layer over-lying said rupture line; and
   e. end closure means for closing the ends of said body wall, thereby permitting said inner and outer layers to be ruptured along said intermediate line of weakness to facilitate removal of a dough product from the container upon striking a predetermined area of said body wall with moderate indenting force against a straight edge of a kitchen counter or the like.

5. An easy one-step opening "no-peel" type container for pressurized dough products, comprising
   a. a relatively stiff fibrous body layer (13) helically wound to define a tubular body wall, the longitudinal edges of said body layer defining a helically wound butt joint that extends the full length of said tubular body wall;
   b. inner and outer moisture-resistant barrier layers (12, 14) permanently laminated to the inner and outer surfaces of said body wall, respectively, in bridging relation across said butt joint;
   c. a pair of metallic end closure means (11) connected with the ends of said fibrous body wall for closing the ends thereof, respectively; and
   d. a pair of spaced non-metallic butt joint reinforcing means (18) arranged solely at opposite ends of said butt joint, respectively, each of said reinforcing means being operable to connect together the adjacent edge portions of said butt joint and thereby reinforce the end portions of said body wall, each of said reinforcing means
      1. extending longitudinally of said butt joint from the corresponding end of said body wall and
      2. terminating at an extremity in spaced relation both to the associated metallic end closure means and to the adjacent end of the outer reinforcing means, thereby to define in the central portion of the butt joint between the spaced adjacent ends of said reinforcing means a line of weakness (15a), thereby permitting said inner and outer barrier layers to be ruptured along said intermediate line of weakness to facilitate removal of the dough product from the container upon striking of said body wall with moderate indenting force against a straight edge of a kitchen counter or the like.

* * * * *